United States Patent [19]

Acker

[11] 4,450,869
[45] May 29, 1984

[54] PILOT-OPERATED VALVE

[75] Inventor: Richard C. Acker, Cleveland, Ohio

[73] Assignee: Teledyne Republic Manufacturing, Cleveland, Ohio

[21] Appl. No.: 286,600

[22] Filed: Jul. 24, 1981

[51] Int. Cl.³ .......................................... F15B 13/042
[52] U.S. Cl. ........................ 137/625.48; 137/625.25; 137/625.66; 137/625.68; 251/282
[58] Field of Search ...................... 137/625.25, 625.48, 137/625.66, 625.68, 884; 251/282, 325, 367

[56] References Cited

U.S. PATENT DOCUMENTS

| 2,792,019 | 5/1957 | Lieser | 137/625.25 X |
| 2,792,020 | 5/1957 | Lieser | 137/625.25 X |
| 2,946,321 | 7/1960 | Lieser | 137/625.66 |
| 3,171,439 | 3/1965 | Lansky et al. | 137/625.66 X |
| 3,215,163 | 11/1965 | Henderson | |
| 3,324,887 | 6/1967 | Mueller | |
| 3,349,800 | 10/1967 | Herion et al. | 137/625.66 |
| 3,599,672 | 8/1971 | Baghuis | 137/625.48 |
| 3,683,966 | 8/1972 | Payne | 137/625.48 |
| 3,993,091 | 11/1976 | Loveless | 251/367 X |
| 4,318,425 | 3/1982 | Marks | 137/625.66 X |

FOREIGN PATENT DOCUMENTS 2157347 7/1972 Fed. Rep. of Germany ........................ 137/625.48

Primary Examiner—Gerald A. Michalsky
Attorney, Agent, or Firm—Pearne, Gordon, Sessions, McCoy, Granger & Tilberry

[57] ABSTRACT

A pneumatic valve is disclosed in which a slide or spool is longitudinally shiftable between two operative positions. The slide is positioned within a body chamber with substantial clearance, and is laterally located within such chamber by elastomeric seals. A balanced valve system is carried by the slide and operates without applying any substantial lateral forces to the slide so that the elastomeric seals can maintain the lateral position of the slide. A manifold assembly formed with grooves open to one face which connect selective ports in the manifold is combined with a valve plate bonded to such face of the manifold block to cooperate with the grooves to form closed passages and to provide the valving surface against which the slide-carried valve elements operate. Because of the high clearance, the valve can operate even when substantial amounts of contamination enter the valve. The valve is also structured to facilitate automatic flushing of contamination from the valve.

7 Claims, 6 Drawing Figures

PILOT-OPERATED VALVE

BACKGROUND OF THE INVENTION

This invention relates generally to pneumatic valves, and more particularly to a novel and improved pilot-operated, four-way valve.

PRIOR ART

U.S. Pat. No. 3,215,163 to Henderson discloses a two-position, four-way, pilot-operated valve utilizing a spool in which O-ring seals are carried by the spool and wherein a pressure-balanced, floating valve element performs the valving functions. With such structure, relatively low valve operating forces are required, and the resilient seals are not required to pass over ports during the valve operation.

Such valve has been used, for example, in the range shifting system for heavy truck transmissions. This patent is assigned to the assignee of the present invention, and is incorporated herein by reference in its entirety.

In such range operating systems, the valve is often exposed to dust, dirt, or other contamination, such as moisture, which can, in aggravated situations, cause the accumulation of grit and corrosion that can hinder the continued proper operation of the valve.

It has also been known to provide a valve structure in which a valve slide is laterally positioned by balanced valve sleeves so that the slide normally remains spaced from the walls of the valve chamber. An example of such a valve is disclosed in U.S. Pat. No. 3,324,887. Both of these patents are assigned to the assignee of the present invention.

SUMMARY OF THE INVENTION

There are a number of important aspects to the present invention. In accordance with one important aspect of the invention, a novel and improved valve structure is provided which permits substantial use of relatively low cost, corrosion-resistant material for principal body parts. Such body parts are preferably formed of aluminum or the like, and the structure is arranged so that they do not have to provide wear surfaces, and therefore need not be provided with surface finishes or wear characteristics required for wear surfaces.

In the illustrated embodiment, the principal body member and the ports manifold are both formed of aluminum or the like. Only two body parts and the slide or spool are formed with wear-resistant surfaces. Further, such aluminum parts are preferably formed as castings to minimize the amount of machining required and the cost of their manufacture. Because such body parts are formed of a material which is inherently corrosion-resistant, they tend to reduce corrosion-induced operational problems.

The remaining valve parts are either formed of stainless steel or are provided with plated surfaces such as nickel plating to combine wear resistance and corrosion resistance.

In accordance with another aspect of this invention, the valve combines a high clearance spool with high clearance resilient seals and lateral pressure balance so that the spool itself floats on and is laterally supported by the seals with substantial clearance. Such structure performs two functions. First, it prevents spool contact with the body parts which are not formed of wear-resistant surfaces or material, allowing the use of such material. Second, it tends to reduce the likelihood of malfunction of the valve if dirt or other contamination enters the valve. Further, the valve structure is provided with large exhaust ports which tend to cause the valve to flush out any contamination, thereby reducing any tendency for contamination to collect within the valve.

In accordance with still another aspect of this invention, a novel and improved manifold block and valve plate combination is provided in which the manifold passages are formed as grooves open to one face of the manifold block, and such grooves are closed by a valve plate which also provides the valving surface. In the illustrated embodiment, the manifold block is preferably an aluminum casting providing cast-in grooves which are arranged to connect selected ports. A valve plate, preferably formed of stainless steel having good wear and corrosion resistance, is bonded to the block to close the grooves and provide the required closed passages. The balance valve element acts on the opposite face of the valve plate.

Further, the structure is arranged so that the supply pressure is connected through the manifold block to a supply port in the valve plate. A single static resilient seal is positioned in such supply port in the plate to eliminate any requirement for countersinking the body to provide a seat for such seal. Since the remaining portions of the joint between the main body and the valve plate are subjected only to exhaust pressure, it is not necessary to provide any additional gasket or seal therebetween.

These and other aspects of this invention are illustrated in the drawings, and are more fully described in the following specification.

DETAILED DESCRIPTION OF THE DRAWINGS

Figure 1:
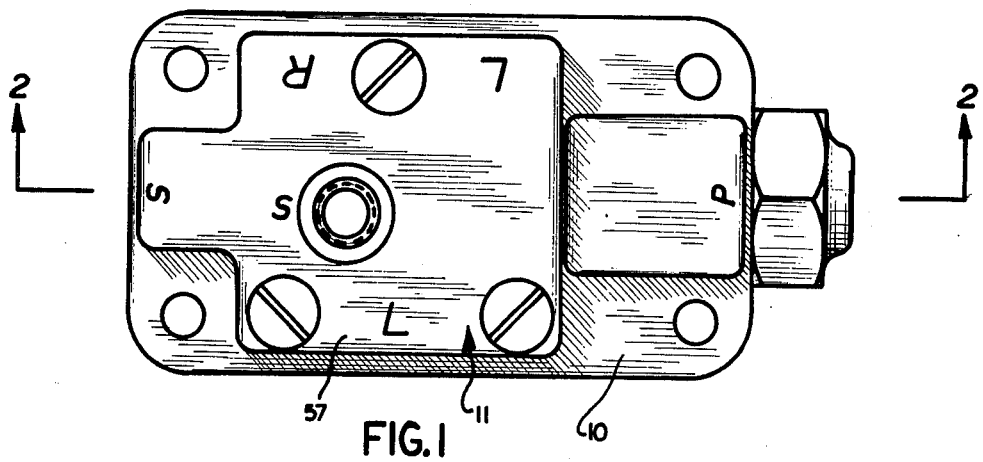
FIG. 1 is a plan view of a valve incorporating this invention.
Figure 2:
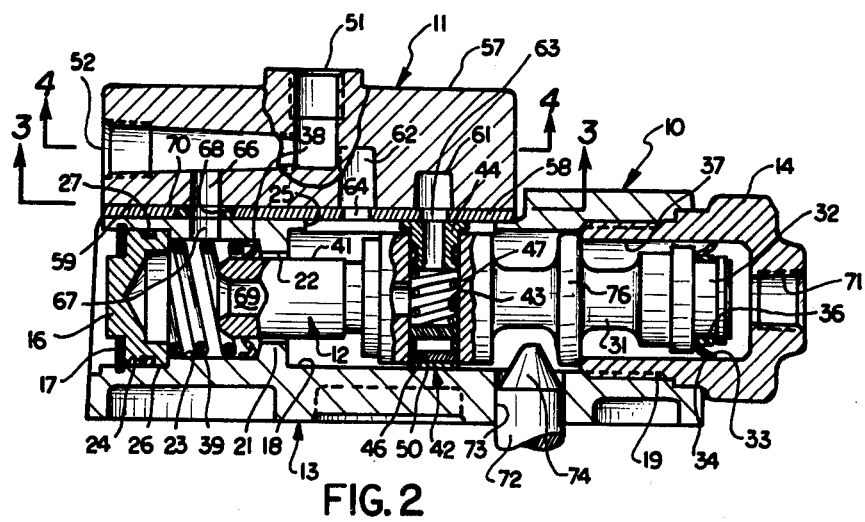
FIG. 2 is a longitudinal section taken generally along line 2—2 of FIG. 1.

Referring to FIGS. 1 and 2, the illustrated embodiment of this invention is a pneumatic pilot-generated valve providing a body assembly 10, a manifold assembly 11, and a slide or spool assembly 12. The body assembly consists primarily of three parts: a body member 13, an end cap 14 threaded into one end of the body member 13, and a plug 16 secured in the other end of the body member 13 by a snap ring 17. Formed in the body member 13 is a central passage 18 which is threaded at one end at 19 to receive the end cap 14. Such passage extends with a substantially constant diameter to an inwardly extending apertured wall 21 defining a reduced diameter opening 22 coaxial with the central passage 18. Beyond the wall 21, the body member is formed with a cylindrical passage 23, which extends to a counterbore 24. The plug 16 is positioned in the counterbore 24 against a shoulder 26 which joins the counterbore 24 and the passage 23. A seal 27 on the plug 16 prevents leakage of fluid under pressure between the plug and the counterbore 24. An opening 25 is provided which exposes a portion of the manifold assembly 11.

The spool or slide assembly 12 includes a spool member 31 formed with a seal retaining groove 32 in which a first elastomeric type seal 33 is mounted. Such seal is preferably a high clearance seal which is capable of providing a fluidtight dynamic seal between relatively spaced or high clearance parts. The illustrated seal is of the "K-type" having an angulated conical wall portion 34 which is inclined radially outward from a cylindrical leg 36 positioned along the bottom of the groove 32. The wall portion 34 engages the surface of a cylindrical bore 37 formed in the end cap 14.

A similar second seal 38 is mounted in the body member 13 against the wall 21 and is biased by a coil spring 39 toward such position. In this instance, the seal is fixed against movement with respect to the body and is provided with an angulated, conical wall which extends from the body to a cylindrical outer surface 41 along the adjacent end of the spool 13 to provide a fluidtight joint therebetween.

A balanced valving assembly 42 is located within a crossbore 43 and includes a floating valve member 44 and a floating reaction member 46 which are urged in opposite directions by a central coil spring 47. Seals are provided on each member 44 and 46 to prevent leakage between the spool and the respective members. Such seal provides a substantially zero leakage seal and results in a structure in which there are substantially no lateral forces applied to the spool by the valving system. The reaction member is provided with a pad 50 formed of low friction material such as Teflon or the like which can slide along the aluminum body without significant wear or friction. Since such pad is not required to form a seal, such material performs satisfactorily. Reference may be made to the Henderson U.S. Pat. No. 3,215,163, supra, for a more detailed description of the operation of the balance type seal system 42.

Figure 4:
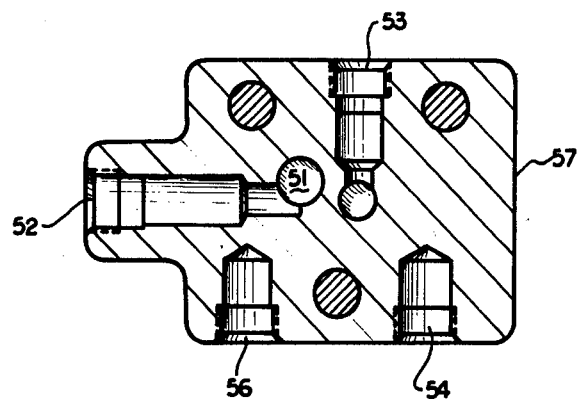
FIG. 4 is a section through the manifold plate taken along line 4—4 of FIG. 2.
Figure 5:
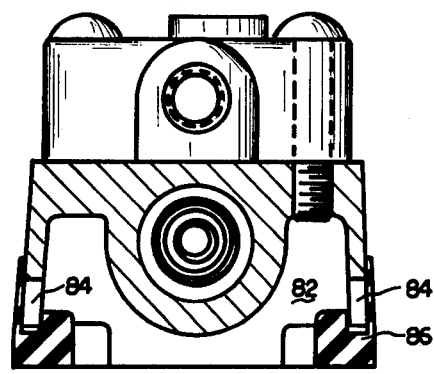
FIG. 5 is a cross section of the valve illustrating the flap valves which cover the exhaust ports to prevent the entry of dirt or other contamination.

The manifold assembly 11 is provided with a plurality of ports for connecting the valve to the associated system. Referring to FIGS. 2 and 4, there are two supply ports 51 and 52 to which supply pressure can be connected to the valve. Two supply ports are provided so that the valve can be installed in various positions. Also, one may be connected to the available supply line and the other may be connected to the pilot valve (not illustrated). Similarly, two interconnected control ports 53 and 54 are provided with one on each side of the manifold. Here again, multiple ports are provided to allow the valve to be conveniently coupled in various positions.

Another control port 56 is also provided. As illustrated in FIG. 1, indicia are preferably provided adjacent to the various ports, e.g., the two "L"'s adjacent to the ports 53 and 54 represent left and the "R" adjacent to the port 56 indicates right. In such instance, the right end of a controlled cylinder is connected to the "R" port 56 and the left end is connected to either of the "L" ports 53 or 54. Normally, the unused port is plugged. Similarly, an S is provided in the manifold adjacent to each of the supply ports 51 and 52 to indicate their function.

The manifold assembly includes a manifold body 57 and a valve plate 58 secured to one surface 59 of the manifold. Preferably, the manifold is formed as a casting, which, in the illustrated embodiment, is aluminum. The valve plate 58 is preferably stainless steel or other suitable corrosion and wear-resistant material. In the illustrated embodiment, the valve plate is secured to the face 59 by a suitable adhesive, so that a fluidtight joint is provided along the interface therebetween.

Figure 3:
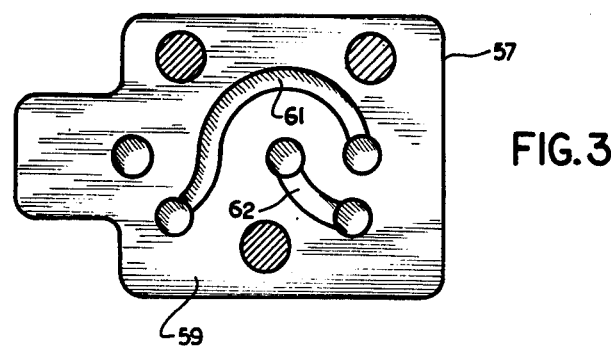
FIG. 3 is a view of the manifold block taken generally along line 3—3 of FIG. 2, illustrating the grooves which interconnect selected ports.

As best illustrated in FIGS. 2 and 3, the underside of the manifold member 57 is provided with a pair of grooves 61 and 62, which are open to the face 59. The groove 61 interconnects the port 56 and a first opening 63 in the valve plate 58, the groove 62 connects the port 54 and the port 53, and also connects with a valve opening 64 in the valve plate. As best illustrated in FIG. 2, the groove 61 is relatively shallow, so that it can extend past the port 53 while being isolated therefrom. The groove 62, on the other hand, is sufficiently deep so that it communicates directly with the port 54 and the port 53. When the valve plate 58 is sealed against the surface 59, it cooperates with the grooves to provide closed passages which provide the desired interconnection between the various ports.

The side of the valve plate 51 opposite the manifold, however, also performs the function of providing the valving surface against which the valve member 44 engages and moves to provide the valve operation. With this simple structure, a relatively complex manifold system can be easily manufactured by die casting or the like, and a wear-resistant, corrosion-resistant, simple valve plate cooperates to provide the manifold passage system as well as the valving surface which has the wear characteristics necessary for satisfactory valve operation over an extended period of time.

Supply pressure is introduced from the supply ports 51 or 52 through a lateral passage 66 in the manifold, which is open, through an opening 70 in the valve plate to a passage 67 in the valve body. The opening 70 in the valve plate 58 is large enough to receive an O-ring seal 68 or the like to provide a fluidtight joint between the manifold assembly 11 and the body assembly 10. By this simple expediency of providing an opening 70 sized to receive the seal 68, full sealing is provided between the three parts 10, 11, and 58, and seal location and position are provided without necessitating the use of counterbores or the like.

A central passage 69 extends along the spool from the left end thereof, as viewed in FIG. 2, to the crossbore 43 so that supply pressure is provided in the crossbore 43. Control pressure from a pilot valve or the like is connected to the right end of the spool through a central port 71 formed in the end cap 14.

A lock pin 72 extends through a side bore 73 into the body and operates, when extended, to mechanically lock the spool in one or the other of its operative positions. Such lock pin is retractable by a mechanism (not illustrated) to allow valve operation. The end 73 of the lock pin 72 is formed with a conical shape and such conical end extends radially inward beyond the periphery of a land 76 on the spool. When the lock pin is in the illustrated position, the spool cannot shift to the left even when operating pressure is supplied to the control port 71. When the lock pin is retracted while pressure is supplied to the control port 71, the spool shifts to the left from the illustrated position and if, at that time, the lock pin is again extended, it retains the valve in the operative position until the lock pin is retracted again, even if control pressure is removed from the port 71.

Preferably, the edges of the land 76 are radiused so that a sharp edge does not engage the conical land. With this conical end structure in combination with the radiuses on the land, the forces required to withdraw or retract a lock pin are not excessive, even when the lock pin must be retracted after spool shifting pressures exist.

It should be noted that substantial radial clearance is provided between the various portions of the spool and the adjacent portions of the valve body. Since there are no significant pressure-induced forces tending to laterally displace the spool, the spool is effectively centered by the two seals 33 and 38. Consequently, there is no rubbing contact between the spool and the valve body and, therefore, wear does not occur. The only sliding or rubbing contact is provided between the seal 33 and the cylindrical wall 37 of the end cap, between the seal 38 and the cylindrical portion 41 of the spool, between the valve member 44 and the valve plate 58, and between the pad 50 and the body.

Preferably, the spool member 31 and the end cap 14 are formed of steel which is nickel-plated to provide a wear-resistant, good sealing surface for the dynamic seals. The body, on the other hand, because it is not subjected to any metal-to-metal wear contact, is preferably formed as a die casting of aluminum or the like. Preferably, substantially all of the parts of the valve are formed with corrosion-resistant material to minimize any corrosion problems.

Figure 6:
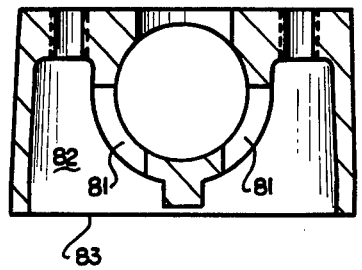
FIG. 6 is a sectional view of the valve body illustrating the exhaust ports from the valve chamber itself.

Further, since high clearances are provided between the moving parts, malfunctions caused by the presence of dust, dirt, or other contamination are virtually eliminated and the valve can properly function even when substantial amounts of contamination are present. It is also preferable to provide large exhaust ports 81 (illustrated in FIG. 6) so the contamination which might enter the valve tends to be flushed out of the valve into the exhaust area 82 formed in the lower part of the valve body. Normally, the valve is installed with the bottom surface 83 against a mating part which closes the cavity 82. In such instances, such cavity 82 provides communication between the exhaust ports 81 and outer exhaust ports 84. Rubber flat valves 86 engage the outer surface of the body around the ports 84 to prevent entry of contamination, but are deflectable when the valve is operating to allow free exhaust into the atmosphere.

The operation of this valve is as follows. Supply pressure is supplied to the crossbore 43 through one or the other of the supply ports 51 or 52 and the two passages 66 and 67. The left end of the spool is pressurized with supply pressure and the spool is urged to the right (as viewed in FIG. 2) so long as the right end of the spool is not also pressurized. Further, the supply pressure communicates through the opening 63 and groove 61 to the port 56. The other two control ports 53 and 54 are connected through the opening 64 to exhaust.

While the connected cylinder or the like is operating, any exhaust air is carried out through large exhaust ports 81 and past the flap valves 86. Any contamination which collects in the valve tends to be flushed out during such time.

When operating pressure is supplied to the port 71 through a pilot valve (not illustrated), the right side of the spool is pressurized as well as the left side. Since the effective area of the right end of the spool is greater than the effective area of the left end of the spool, a fluid pressure-induced force is exerted on the spool, tending to move it to the left or to its other operative position. If the lock pin remains extended when this occurs, the land 76 engages the lock pin and operation of the spool cannot occur. However, as soon as the lock pin is retracted while pressure remains on the right side of the spool, the spool shifts to the left connecting the supply pressure through the passage 64 to the two control ports 53 and 54. At such time, the control port 56 is connected to exhaust. If the lock pin is then extended, the spool is locked in its operative left position even if control pressure is removed from the port 71. Subsequently, the valve can be operated back to its illustrated position by removing the pressure from the port 71 while the lock pin is retracted.

In the illustrated embodiment, the seal 33 is mounted on the spool while the seal 38 is mounted on the body. Such a combination provides a maximum differential area for valve operation within a relatively small space. In instances in which greater space is available, it may be desirable to provide both of the seals on the body so that the end cap need not be formed of wear-resistant material.

With a valve incorporating the present invention, a substantial amount of the valve structure is formed of lightweight, corrosion-resistant aluminum, or the like, which need not be subjected to sliding wear. Further, the parts can to a considerable degree be formed as castings, eliminating the need for substantial machining. The spool, because it is suspended with substantial clearance by the seal and does not rub against the aluminum parts, eliminates metal-to-metal sliding wear and provides a structure which can function satisfactorily when substantial amounts of contamination are in the valve. Further, the valve structure with its large ports and large clearances tends to cause contamination to be flushed out of the valve to present excessive accumulations thereof.

A simple valving plate cooperates, on the one hand, to provide the valve surface and, on the other hand, to enclose the grooves, thereby making it possible to form a low-cost, effective manifold even when relatively complicated porting arrangements are required.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A valve comprising an elongated housing assembly including a body formed of a material having poor wear resistance qualities and providing an elongated central passage therein, said passage providing a lateral opening therein intermediate its ends, a valve plate providing valve ports therein open to said passage mounted on said body and closing said lateral opening, said valve plate providing a valving surface exposed to said passage around said ports having good wear resistance properties, a slide reciprocable in said passage providing a central opening therein, balanced valve means carried by said slide engageable with said valving surface and operable to selectively connect said ports to said central opening in said slide, said slide being provided with surfaces providing good wear resistance properties, a plurality of resilient seals providing a fluid-tight joint between said slide and said housing assembly, at least one of said seals being mounted on said body and fixed against movement relative thereto to prevent wear between said seal and said body, said one seal providing a dynamic seal with said slide, said slide being formed with substantial lateral clearance with respect to said central passage, said valve means operating without producing material lateral forces on said slide, said seals operating to center said slide in said passage and prevent contact between said slide and the walls of said passage to prevent wear in the walls of said passage and to permit continued operation of said valve when substantial amounts of contamination are present within said valve, a manifold block including a plurality of control ports and grooves open to one face of said block connecting at least some of said control ports, said manifold block being mounted along said one face against the side of said valve plate opposite said body so that said grooves connect said control ports to said valve ports, said manifold block including a inlet port connected to said central opening in said slide through passages formed in said manifold block, said valve plate and said body, and a single seal positioned within said valve plate providing a seal between said passages in said manifold block and said valve plate and said body, said manifold block being formed of material having poor wear resistance qualities and being free of contact with moving parts during the operation of said valve.

2. A valve as set forth in claim 1, wherein said seals are K-type seals.

3. A valve as set forth in claim 1, wherein said seals provide a conical leg which extends at an angle between said slide and housing assembly to provide a seal therebetween and to resiliently provide lateral support for said slide.

4. A valve as set forth in claim 1, wherein said body is formed of a corrosion-resistant material such as aluminum and the like, and said valve plate is formed of ferrous material.

5. A valve as set forth in claim 4, wherein said valve plate is stainless steel.

6. A valve as set forth in claim 1, wherein said body is formed with large exhaust ports open to said central passage through which fluid is exhausted from said valve, said exhaust ports being sized and positioned so that contamination entering said valve tends to be flushed therefrom during the operation of said valve.

7. A valve as set forth in claim 1, wherein said balanced valve means includes a wear-resistant pad engageable with said body and movable relative thereto without causing wear of said body.

* * * * *